US009100122B2

(12) United States Patent
VanPatten et al.

(10) Patent No.: US 9,100,122 B2
(45) Date of Patent: Aug. 4, 2015

(54) METHOD AND SYSTEM TO ANALYZE INTERFERENCE SUSCEPTIBILITY OF A RADIO RECEIVER DESIGN

(75) Inventors: John H. VanPatten, Columbia City, IN (US); William H. Davis, Columbia City, IN (US)

(73) Assignee: Raytheon Company, Waltham, MA (US)

( * ) Notice: Subject to any disclaimer, the term of this patent is extended or adjusted under 35 U.S.C. 154(b) by 278 days.

(21) Appl. No.: 13/475,248

(22) Filed: May 18, 2012

(65) Prior Publication Data

US 2013/0309987 A1  Nov. 21, 2013

(51) Int. Cl.
| H04B 17/00 | (2006.01) |
| H04B 17/391 | (2015.01) |
| H04B 17/29 | (2015.01) |
| H04B 17/345 | (2015.01) |

(52) U.S. Cl.
CPC ............ *H04B 17/3913* (2015.01); *H04B 17/29* (2015.01); *H04B 17/345* (2015.01)

(58) Field of Classification Search
CPC ....... H04B 1/16; H04B 17/00; H04B 17/0042
USPC ......... 455/130, 226.1–226.4, 67.13, 63.1, 73; 342/169
See application file for complete search history.

(56) References Cited

U.S. PATENT DOCUMENTS

| 4,581,767 A | 4/1986 | Monsen | |
| 5,875,391 A * | 2/1999 | Riley et al. | 455/295 |
| 6,625,454 B1 | 9/2003 | Rappaport et al. | |
| 7,085,697 B1 * | 8/2006 | Rappaport et al. | 703/13 |
| 7,427,947 B1 | 9/2008 | Dark et al. | |
| 7,511,657 B2 | 3/2009 | Dark et al. | |
| 7,515,096 B2 | 4/2009 | Dark et al. | |
| 7,737,883 B2 | 6/2010 | Dark et al. | |
| 7,847,723 B1 | 12/2010 | Dark et al. | |
| 7,893,866 B2 | 2/2011 | Dark et al. | |
| 8,086,187 B1 * | 12/2011 | Davis et al. | 455/67.13 |
| 8,112,261 B2 * | 2/2012 | Song et al. | 703/13 |

(Continued)

FOREIGN PATENT DOCUMENTS

| EP | 2 230 863 A2 | 9/2010 |
| WO | WO 2006/102257 A2 | 9/2006 |

OTHER PUBLICATIONS

Young et al., "An Automated Measurement System for Cosite Interference Analysis;", IEEE, Electromagnetic Compatibility (EMC); Jul. 25, 2010; pp. 863-868.*

(Continued)

*Primary Examiner* — Nay A Maung
*Assistant Examiner* — Angelica M Perez
(74) *Attorney, Agent, or Firm* — Daly, Crowley, Mofford & Durkee, LLP (57) ABSTRACT

Systems and methods are disclosed to analyze and predict the interference susceptibility of receiver designs. In some implementations, the systems and methods may be used during a receiver design phase to predict how well a receiver design will perform in the presence of certain types of signals in a deployment region of a receiver. The systems and methods may allow potential shortcomings in a receiver design affecting interference susceptibility to be identified and remedied before any actual receiver hardware is constructed, thereby reducing costs typically associated with complex hardware redesign efforts.

17 Claims, 6 Drawing Sheets

(56) References Cited

U.S. PATENT DOCUMENTS

| 8,957,811 | B2 | 2/2015 | Davis et al. | |
|---|---|---|---|---|
| 2003/0040277 | A1* | 2/2003 | Deats | 455/63 |
| 2006/0094365 | A1* | 5/2006 | Inogai et al. | 455/67.11 |
| 2009/0037149 | A1 | 2/2009 | Vitek | |
| 2011/0263265 | A1 | 10/2011 | Caretti et al. | |
| 2012/0040602 | A1 | 2/2012 | Charland | |
| 2013/0307715 | A1 | 11/2013 | Davis et al. | |
| 2013/0307726 | A1 | 11/2013 | Davis et al. | |

OTHER PUBLICATIONS

German et al., "A Muli-Fidelity Approach for Cosite Interference Analysis;" Electromagnetic Compatibility (EMC); IEEE International Symposium; Aug. 17, 2009; pp. 195-200.*
Application of Davis, et al.; U.S. Appl. No. 13/475,244, filed May 18, 2012.
Application of Davis, et al.; U.S. Appl. No. 13/475,233, filed May 18, 2012.
German, et al.; "A Multi-Fidelity Modelling Approach for Cosite Interference Analysis;" Electromagnetic Compatibility (EMC); IEEE International Symposium; Aug. 17, 2009; pp. 195-200.
Young et al.; "An Automated Measurement System for Cosite Interference Analysis;" IEEE; Electromagnetic Compatibility (EMC); Jul. 25, 2010; pp. 863-868.
PCT Search Report of the ISA for PCT/US2013/039406 dated Jul. 12, 2013.
Written Opinion of the ISA for PCT/US2013/039406 dated Jul. 12, 2013.
COMSET Brochure; "Communication System Engineering Tool;" Raytheon; Nov. 11, 2009; 2 pages.
PCT Search Report and Written Opinion of the ISA for PCT/US2013/039398 dated Nov. 8, 2013.
Invitation to Pay Additional Fees and, Where Applicable, Protest Fee dated Aug. 27, 2013 for PCT/US2013/039398.
Notice of Allowance dated Oct. 27, 2014 for U.S. Appl. No. 13/475,244; 5 pages.
Office Action dated Jul. 7, 2014 for U.S. Appl. No. 13/475,244 filed on May 18, 2012.
Response to Jul. 7, 2014 Office Action as filed on Oct. 6, 2014 for U.S. Appl. No. 13/475,244, filed May 18, 2012.
Office Action dated Jul. 2, 2014 for U.S. Appl. No. 13/475,233, filed on May 18, 2012.
Response to Jul. 2, 2014 Office Action as filed on Jul. 18, 2014 for U.S. Appl. No. 13/475,233, filed May 18, 2012.
Occice Action dated Sep. 19, 2014 for U.S. Appl. No. 13/475,233, filed on May 18, 2012.
International Preliminary Report on Patentability and Written Opinion dated Nov. 27, 2014 corresponding to PCT Appl. No. PCT/US2013/039398; 9 Pages.
International Preliminary Report on Patentability and Written Opinion dated Nov. 27, 2014 corresponding to PCT Appl. No. PCT/US2013/039421; 10 Pages.
International Preliminary Report on Patentability and Written Opinion of the ISA dated Nov. 27, 2014 corresponding to PCT Appl. No. PCT/US2013/039406; 9 Pages.
Response to Office Action dated Sep. 19, 2014 corresponding to U.S. Appl. No. 13/475,233, filed Dec. 15, 2014; 12 Pages.
PCT Search Report of the ISA for PCT/US2013/039421 dated Feb. 13, 2013.
PCT Written Opinion of the ISA for PCT/US2013/039421 dated Feb. 13, 2013.
Final Office Action dated Mar. 11, 2015 corresponding to U.S. Appl. No. 13/475,233; 9 Pages.
New Zealand First Examination Report dated Mar. 11, 2015 corresponding to New Zealand Application No. 702006; 4 Pages.
New Zealand First Examination Report dated Mar. 13, 2015 corresponding to New Zealand Application No. 702007; 3 Pages.
New Zealand First Examination Report dated Mar. 13, 2015 corresponding to New Zealand Application No. 701999; 4 Pages.
Australian Examination Report dated May 19, 2015 corresponding to Australian Patent Application No. 2013263207; 3 Pages.

* cited by examiner

METHOD AND SYSTEM TO ANALYZE INTERFERENCE SUSCEPTIBILITY OF A RADIO RECEIVER DESIGN

FIELD

Disclosed subject matter relates generally to radio frequency (RF) systems and, more particularly, to techniques and systems for predicting and analyzing interference susceptibility performance for an RF receiver.

BACKGROUND

Performance characteristics of radio frequency (RF) receivers are typically well defined and well specified for situations where there is no interference. Receiver performance in the presence of interference, on the other hand, is not typically specified or well quantified. Scenarios where multiple radios operate concurrently on a common platform are increasing in both military and civilian environments. For this reason, performance degradation within radio receivers caused by transmissions from nearby transmitters may become more of a problem.

Historically, the negative effects on receiver performance caused by transmissions from nearby transmitters have been tested in a lab or other controlled environment. However, this approach required a radio receiver to be built, an elaborate test set up to be assembled, and a laborious test process to be undertaken. If the measurement results displayed poor receiver performance in the presence of certain types of interference, then expensive redesign efforts would often be performed to make the receiver performance less sensitive to these types of interference. There is a need for techniques that allow receiver performance in the presence of interference to be predicted and analyzed at the design stage before a receiver is built.

SUMMARY

In accordance with the concepts, systems, circuits, and techniques described herein, a machine implemented method to analyze interference susceptibility of a radio receiver design, comprises: receiving input identifying a receiver model describing a receiver to be analyzed; receiving input identifying a receive frequency to be analyzed; receiving input identifying a transmitter model describing a transmitter to be analyzed as a source of interference; receiving input identifying a number of offset transmit frequencies to be analyzed as interference; determining a receive signal power level to generate a predetermined performance level in the receiver in the absence of interference; for each of the number of offset transmit frequencies, performing an interference analysis using the receiver model, the receive frequency, the transmitter model, and the receive signal power level for a plurality of different transmit power levels to generate a plurality of performance metrics corresponding to the plurality of different transmit power levels; for each of the number of offset transmit frequencies, determining a transmit power level that results in a predetermined level of performance degradation for the offset transmit frequency; and generating a plot using the determined transmit power levels.

In one particular embodiment, the receiver model and/or transmit model are user-defined models stored in a database (e.g., a receiver model database or a transmitter model database).

In accordance with another aspect of the concepts, systems, circuits and techniques described herein, a system to analyze interference susceptibility of a radio receiver design, comprises: a database of receiver models; a database of transmitter models; a user interface to receive input from a user regarding an interference susceptibility analysis to be performed; an interference analysis processor to perform interference analyses for a receiver design based on input information; and an interference susceptibility controller to use the interference analysis processor to generate interference susceptibility information for an identified receiver design.

In accordance with a further aspect of the concepts, systems, circuits and techniques described herein, a system to analyze interference susceptibility of a radio receiver design, comprises: means for receiving input identifying user selected parameters for use in performing an interference susceptibility analysis, the user selected parameters including a receiver model describing a receiver to be analyzed, a receive frequency to be analyzed, a transmitter model describing a transmitter to be analyzed as a source of interference, and a number of offset transmit frequencies to be analyzed as interference; means for determining a receive signal power level to generate a predetermined receiver performance level in the absence of interference; means for performing an interference analysis using the receiver model, the receive frequency, the transmitter model, and the receive signal power level for each of the number of offset transmit frequencies at a plurality of different transmit power levels to generate a plurality of performance metrics for each offset transmit frequency corresponding to the plurality of different transmit power levels; means for determining a transmit power level that results in a predetermined level of performance degradation in the receiver for each offset transmit frequency by analyzing a corresponding plurality of performance metrics; and means for generating a plot using the determined transmit power levels.

BRIEF DESCRIPTION OF THE DRAWINGS

The foregoing features of this invention, as well as the invention itself, may be more fully understood from the following description of the drawings in which.

DETAILED DESCRIPTION

The concepts described herein relate to strategies, techniques, and systems that may be used to predict or analyze the interference susceptibility of a receiver (or during receiver design) before any hardware is actually manufactured. In various implementations, the techniques and systems may be used to determine whether receiver design changes would enable a receiver to better tolerate certain expected types of interference in a deployment environment. For example, a designer may know that a radio receiver may be implemented on a platform (e.g., a ship, an aircraft, a ground vehicle, etc.) having specific types of radio and wireless systems which generate signals which could potentially be a source of interference for the radio receiver. The techniques described herein allow the designer to determine whether a radio design tolerates such an environment or whether receiver design changes are needed to meet a specific performance criteria. In some cases, these design changes may be performed before any hardware is built.

Figure 1:
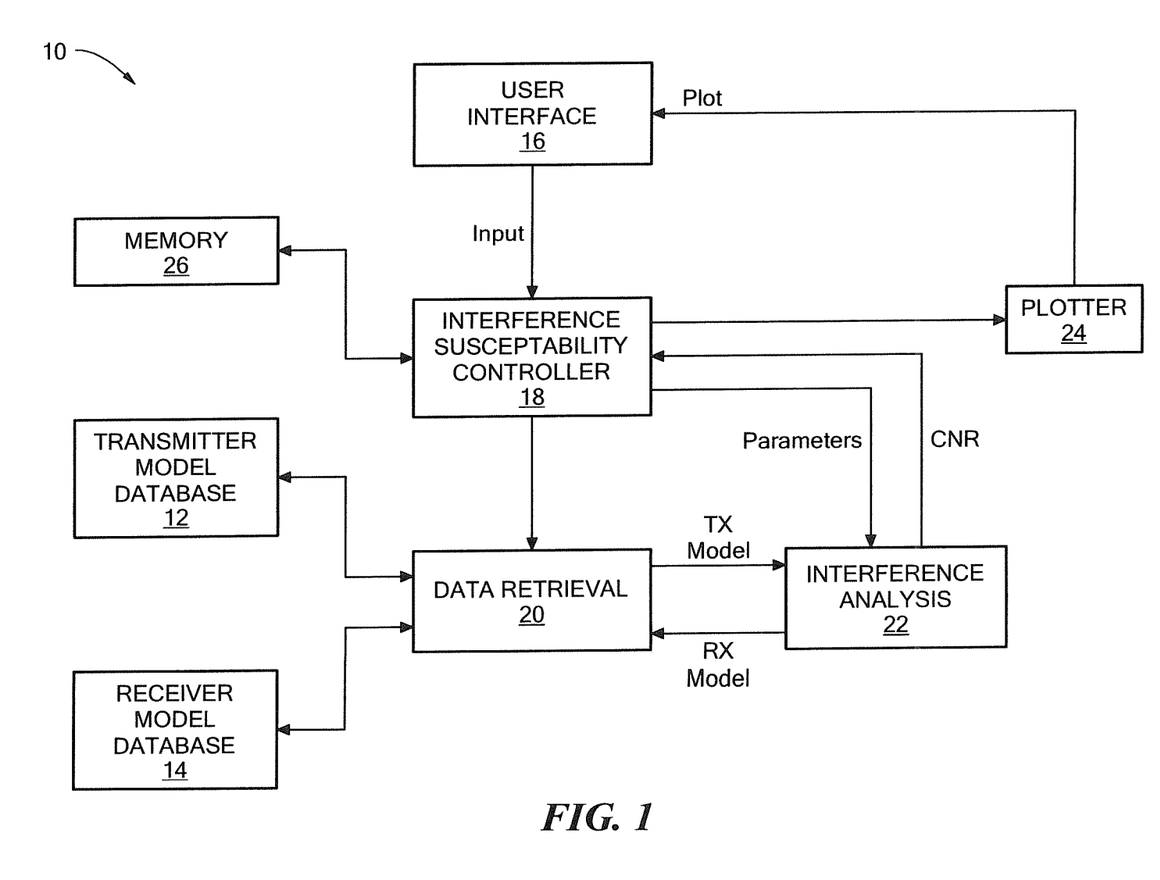
FIG. 1 is a block diagram illustrating an example system for analyzing the interference susceptibility performance of a receiver design in accordance with an implementation.

FIG. 1 is a block diagram illustrating an example system 10 for analyzing the interference susceptibility performance of a receiver design. As shown, the system 10 includes: a transmitter model database 12, a receiver model database 14, a user interface 16, an interference susceptibility controller 18, a data retrieval unit 20, an interference analysis processor 22, a plotter 24, and a memory 26. Transmitter model database 12 and receiver model database 14 may each include a library of models (i.e., a plurality of models) describing performance characteristics of different transmitters and receivers. Such models can be used in an analysis session. In general, a receiver having certain performance characteristics may be specified by a user to represent a receiver design under analysis and similarly a transmitter having certain performance characteristics may be specified to represent a source of interference to be used in the analysis.

User interface 16 provides an interface between a user and the system 10 to allow the user to specify the particulars of an analysis to be performed. User interface 16 may include various hardware input/output devices connected to a computer such as, for example, a display, a mouse, a keyboard, a keypad, and/or other hardware. User interface may also include one or more programs that may be executed in a digital processor to interact with a user to solicit information for use in an analysis. In at least one embodiment, graphical user interface (GUI) functionality may be provided to perform this function.

User interface 16 is coupled to an interference susceptibility controller 18 operative for receiving the input provided by a user and for managing an interference susceptibility analysis process to generate interference susceptibility analysis results for a user. Interference susceptibility controller 18 may deliver interference susceptibility analysis results to plotter 24 to create a plot of the results (e.g., an interference susceptibility characteristic, etc.) for a user.

Interference analysis processor 22 exchanges data/information with interference susceptibility controller 18 and data retrieval unit 20. Interference analysis processor 22 is operative for performing interference analyses for interference susceptibility controller 18 based on input information received from controller 18 and data retrieval unit 20. As stated above, as part of an analysis procedure, a user may specify a particular transmitter model and receiver model to be used during the analysis. Data retrieval unit 20 retrieves these models from the respective databases 12, 14 and delivers them to interference analysis processor 22. Interference susceptibility controller 18 may then deliver further analysis parameters to interference analysis processor 22 to perform a series of interference analyses. The results of these interference analyses may then be returned to interference susceptibility controller 18 for use in generating interference susceptibility information. Interference susceptibility controller 18 may use memory 26 to store the returned results and/or other parameters during the analysis process.

In addition to a receiver model and a transmitter model, a user may specify one or more additional parameters to be used in an interference susceptibility analysis. For example, a user may specify or be prompted to input or select a receive frequency for the receiver under analysis. The user may also specify or be prompted to input or select information identifying a number of individual transmit frequencies, or a range of transmit frequencies, to be used as interference frequencies during an analysis. As will be described in greater detail, during an interference susceptibility analysis, a transmitter (or interference) frequency may be swept through an indicated range to develop data needed to derive interference susceptibility information. A user may also specify or be prompted to input or select an initial condition or initial performance criterion for the receiver that is achieved in the absence of interference that can be used as a baseline for analyzing interference susceptibility. Furthermore, a user may specify or be prompted to input or select a degraded condition or degraded performance criterion for the receiver for use in identifying interference levels that degrade receive performance a predetermined amount.

Interference analysis processor 22 may, in some implementations, receive input information about a receiver (e.g., a receiver model from receiver model database 14), information about certain operating conditions of the receiver (e.g., a user specified receive frequency from interference susceptibility controller 18), information about a transmitter (e.g., a transmitter model from transmitter model database 12), and certain operating conditions of the transmitter (e.g., one or more transmit frequencies to be used as interference from interference susceptibility controller 18) and use this information to generate a performance metric for the receiver in the presence of the interference generated by the transmitter. The performance metric may include a parameter such as, for example, carrier-to-noise ratio (CNR), signal-to-noise ratio (SNR), or other similar metrics. One technique for performing the interference analysis is described in U.S. Pat. No. 8,086,187 to Davis et al. which is co-owned with the present application and is hereby incorporated by reference in its entirety. In at least one implementation, interference susceptibility controller 18 may, for each transmit frequency to be tested, send a series of analysis requests to interference analysis processor 22 corresponding to a number of different power levels. Each request may result in a performance metric of the receiver at the corresponding interference power level. Interference susceptibility controller 18 may save the metric values in memory 26 for later analysis.

This process may then be repeated for each transmit frequency identified by the user or for a number of transmit frequencies in a range specified by the user. For each transmit frequency tested, the performance metric data collected may be analyzed to identify a transmit power level that resulted in the amount of performance degradation identified by the user. To determine this transmit power level, interpolation or a similar technique may be used in some implementations. In another possible approach, the transmit power level input into interference analysis processor 22 may be incrementally increased (or decreased) by interference susceptibility controller 18 until a performance metric is returned that transitions past the amount of performance degradation identified by the user. The corresponding transmit power level may then be recorded. After transmit power levels have been identified for a number of different transmit frequencies, these power levels may be delivered to plotter 24 to be plotted as an interference susceptibility characteristic (ISC) or similar graph.

In some implementations, one or more of the elements of system 10 of FIG. 1 are implemented either partially or fully within digital processing devices. In addition, in some implementations, multiple elements of systems 10 may be implemented within a single digital processing device. For example, in at least one implementation, an interference susceptibility controller 18 and an interference analysis processor 22 may be implemented within the same digital processing device. Any type of digital processing device(s) may be used including, for example, a general purpose microprocessor, a digital signal processor (DSP), a field programmable gate array (FPGA), a reduced instruction set computer (RISC), an application specific integrated circuit (ASIC), a microcontroller, and/or others, including combinations of the above. In addition, any number of digital processing devices may be used. Different embodiments may be implemented in any combination of hardware, software, and/or firmware.

Figure 2:
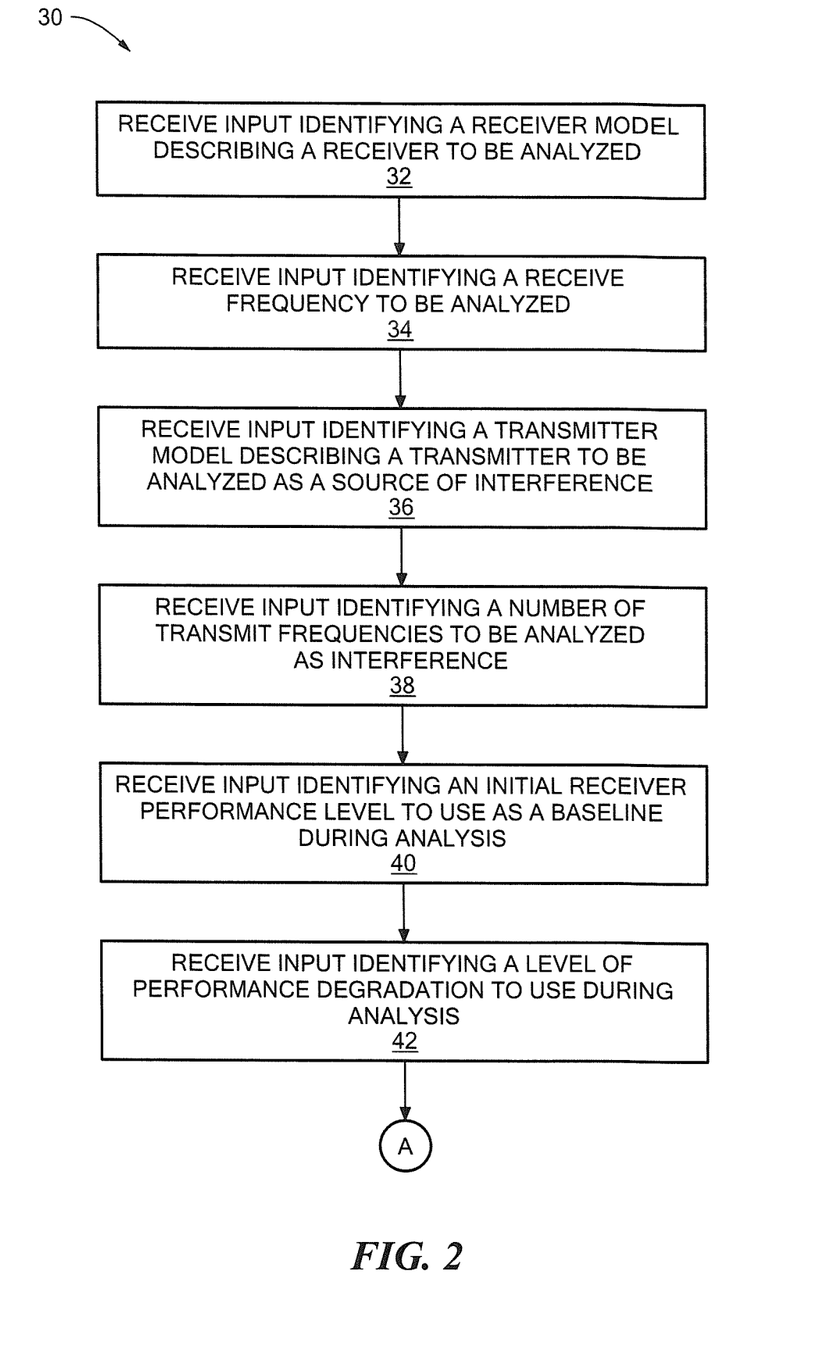
FIGS. 2-3 represent a flow diagram showing a process for analyzing the interference susceptibility of a radio receiver design in accordance with an implementation.
Figure 3:
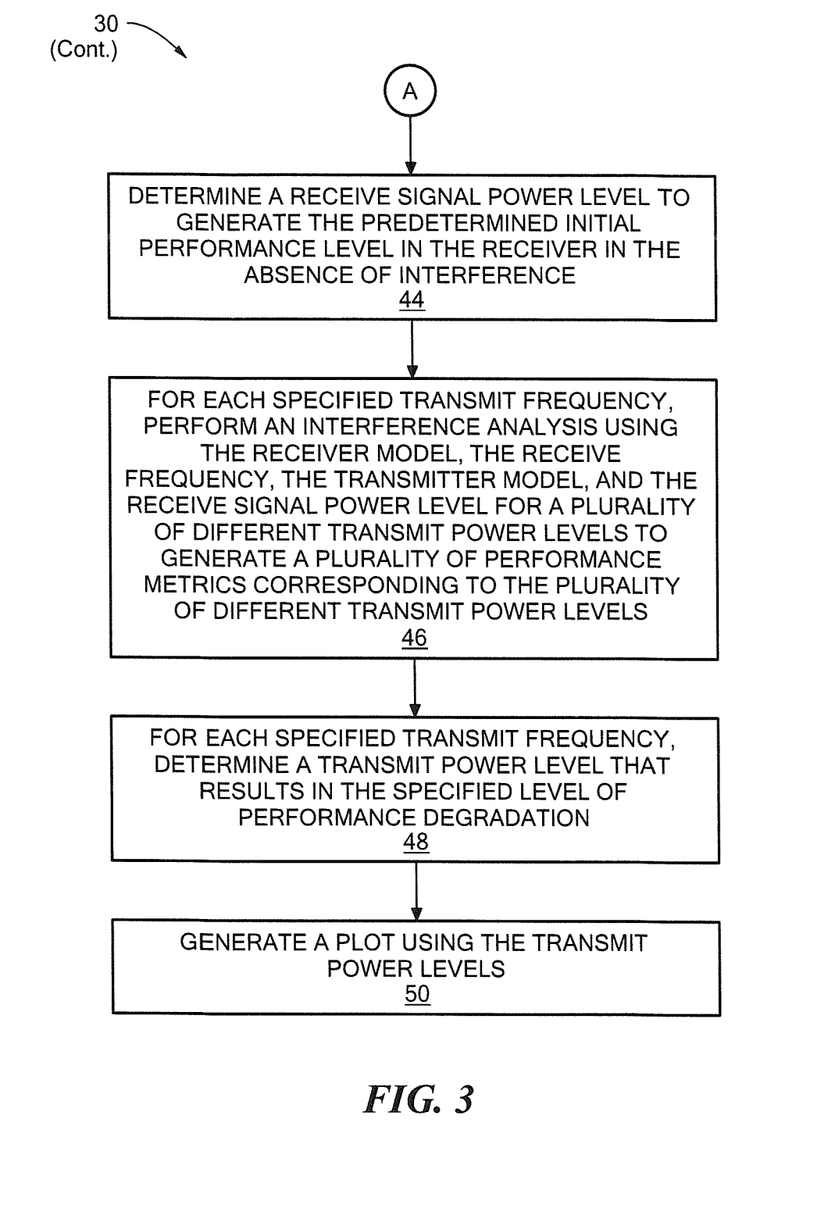

FIGS. 2-3 represent a flow diagram showing a process for analyzing the interference susceptibility of a radio receiver design in accordance with an implementation.

The rectangular elements (typified by element 32 in FIG. 2) are herein denoted "processing blocks" and may represent computer software instructions or groups of instructions. It should be noted that the flow diagram of FIGS. 2-3 (and other flow diagrams herein) represents one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits including but not limited to digital signal processor circuits, application specific integrated circuits (ASIC), or field programmable gate arrays (FPGA). Some processing blocks may be manually performed while other processing blocks may be performed by one or more processors or circuits. The flow diagram does not depict the syntax of any particular programming language. Rather, the flow diagram illustrates the functional information one of ordinary skill in the art requires to fabricate one or more circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIGS. 2-3 and other flow diagrams herein can be performed in any convenient or desirable order.

Referring now to FIGS. 2 and 3, a method 30 for analyzing the interference susceptibility of a radio receiver design in accordance with an implementation is described. Input information may be received from a user identifying a receiver model to be used to describe a receiver design (e.g. a set of receiver characteristics) to be analyzed (block 32). In some implementations, the receiver model may be one of a plurality of different receiver models stored in a database. Input information may also be received from a user identifying a receive frequency at which the receiver is to operate for purposes of the analysis (block 34). Further input information may be received from a user identifying a transmitter model describing a transmitter to be analyzed as a source of interference during an analysis (block 36). In some implementations, the transmitter model may be one of a plurality of different transmitter models stored in a database.

Input information may also be received from a user identifying a number of transmit frequencies, or a range of transmit frequencies, to be analyzed as interference during the analysis (block 38). The transmit frequencies may be specified in any number of different ways by the user. For example, in some implementations, a user may specify a range of frequencies and a frequency increment or decrement value specifying which frequencies are to be tested as interference frequencies. In other implementations, a user may specify a range of frequencies and a number of frequency steps that are to be performed within that range of frequencies. In various implementations, frequencies or ranges may be specified as offsets or as ratios of the specified receive frequency. As will be appreciated, any number of different techniques for specifying transmit frequencies may be used in different implementations.

Input information may also be received identifying an initial receiver performance level (or initial condition) to use as a baseline during analysis (block 40) and a level of performance degradation (or degraded condition) to use during analysis (block 42). In some implementations, an initial receiver performance level and a level of performance degradation may be determined within an analysis system and may not be user-specified. A receive signal power level may then be determined that results in the initial receiver performance level in the receiver in the absence of interference (block 44). This receive signal power level may be determined by, for example, performing a series of interference analyses for a receiver design without specifying any interference and using the results to identify or calculate a receive signal power level that generates the initial receiver performance level.

With reference to FIG. 3, for each transmit frequency (or transmit frequency offset) identified by the user for analysis, an interference analysis may be performed using the specified receiver model, the specified receive frequency, the specified transmitter model, and the receive signal power level for a number of different transmit power levels (block 46). For each transmit power level associated with a transmit frequency, the interference analysis may return a performance metric (e.g., a CNR, etc.). Therefore, a plurality of different performance metrics may be generated for each transmit frequency. For each transmit frequency, a transmit power level may be determined that results in the specified level of performance degradation (block 48). These transmit power levels may be stored for later use. A plot may eventually be generated using the stored transmit power level values (block 50).

In some implementations, a COMSET interference analysis system may be used to perform some of the calculations needed to analyze or predict the susceptibility of a receiver design to interference. The COMSET interference analysis system is owned by Raytheon Corporation and was developed to perform, among other things, interference and interoperability analysis for radio systems and system designs. The COMSET interference analysis tool is described in U.S. Pat. No. 8,086,187.

Figure 4:
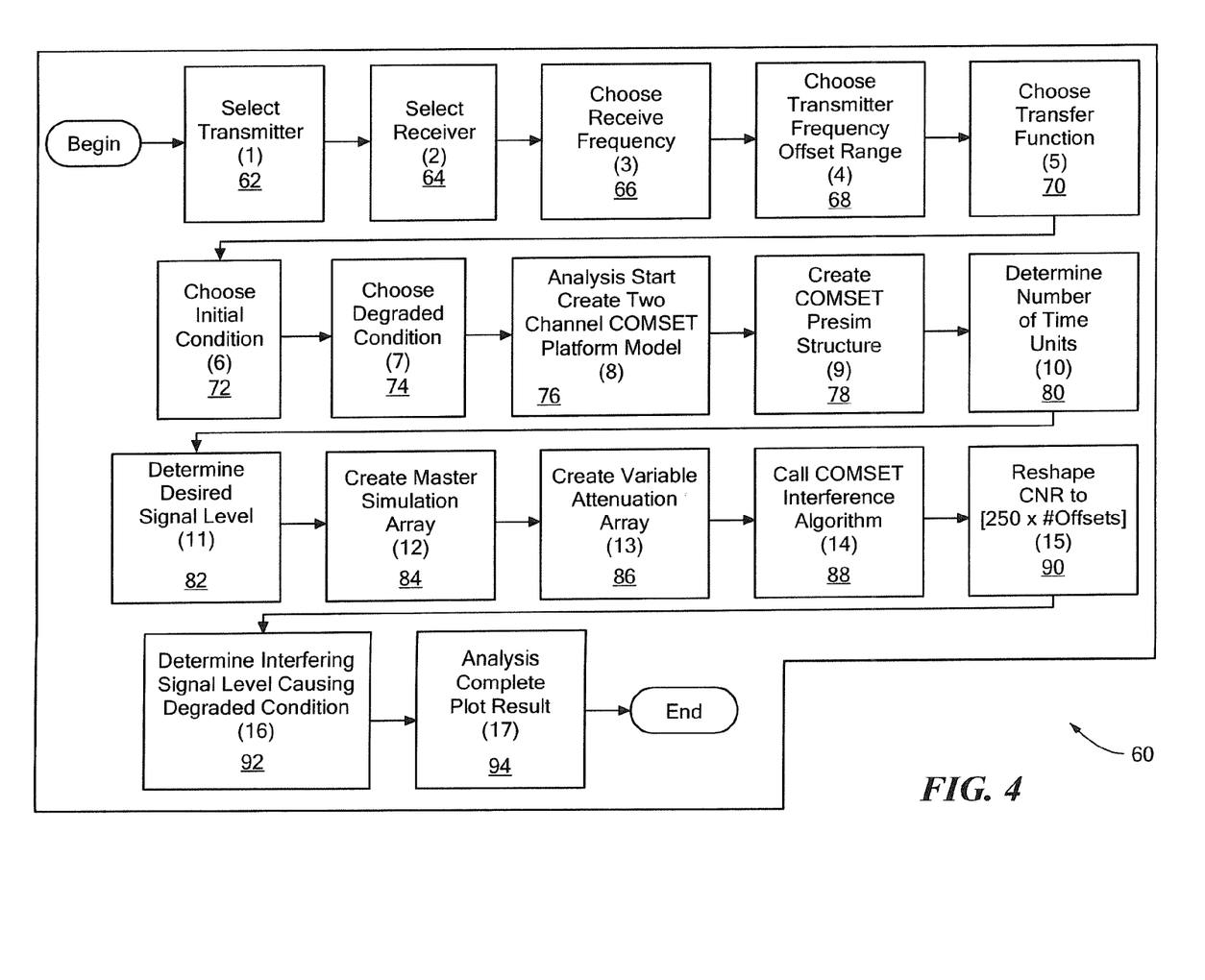
FIG. 4 is a flow diagram illustrating a method for analyzing the interference susceptibility of a radio receiver design using a COMSET interference analysis tool in accordance with an implementation.

FIG. 4 is a flow diagram illustrating a method 60 for analyzing the interference susceptibility of a radio receiver design using a COMSET interference analysis tool in accordance with an implementation. The method 60 of FIG. 4 may be a specific embodiment of the method 30 of FIGS. 2 and 3. A transmit dataset may be selected by a user to represent a transmitter that will act as an interference source for an interference susceptibility analysis (block 62). The transmit dataset may be one of a plurality of pre-established transmit datasets within a transmit dataset library or database in some implementations. A transmit dataset is a transmitter model that is in a particular data format. In some implementations, a transmit dataset may be obtained by analyzing a COMSET transmitter model, and all associated components required to connect the transmitter to an antenna, using electronic design automation software (e.g., the Agilent Advanced Design System (ADS), etc.). The analysis may be performed, for example, using a COMSET Transmit Analysis function which is part of a COMSET Design Kit that has been integrated with Agilent ADS. In at least one implementation, a transmit dataset may be expressed as a Matlab structure (tx) containing the following elements:

tx: Transmit Dataset Data Structure
    Where the dimension variables are as follows:
        M=number of Channel frequencies in each dataset
        N=number of Frequency Offsets in each dataset
    tx.fn: filename of dataset (string)
    tx.name: Dataset Name (string)
    tx.date: Analysis date (datenum)
    tx.fch: matrix of TX Frequencies [M×1] (MHz)
    tx.foff: matrix of TX Offset Frequencies [1×N] (MHz)
    tx.txp: Transmitter Power [M×1] (dBm)
    tx.rip3: Reverse Ip3 [M×1] (dBm)
    tx.rfdgn: TX RFD Gain [M×1] (dB)
    tx.thn: TX Thermal Noise [M×N] matrix (dBm/Hz)
    tx.phn: TX Phase Noise [M×N] matrix (dBm/Hz)
    tx.ppg: Post PA Gain [M×N] matrix (dB)
    tx.fchu: [1×3] array of [min max step] user channel frequencies
    ..tx.foffu: [5×4] array of frequency band information
    Rows define the band, columns are start, stop, step, and number of points
    ..tx.txtyp: Transmitter Type (string)
    ..tx.sisf: Post-PA Gain Selectivity interpolation scale factor and method[M×2]
    ..tx.txmd: Operating Mode 2-N as defined in (integer)
    ..tx.sbw: Signal Bandwidth (Hz)

A receiver model may also be selected by a user to represent a receiver to be analyzed (block 64). In a COMSET-based implementation, the receiver model may include a COMSET receiver model. In at least one implementation, a COMSET receiver model may be expressed as a Matlab structure (rx) that contains, for example, the following elements:

rx: Receiver Model Data Structure.
    Where:
        M refers to the number of receive (center) frequencies
        N refers to the number of offset frequencies (MHz)
    rx.fn: Radio model file name
    rx.avmd: Array of available mode integers in model [1×Nm]
    rx.mode: Integer mode number
    rx.date: Creation date (datenum) same in all elements
    rx.fch: Channel Frequencies [M×1] (MHz)
    rx.foff: Frequency Offsets [N×1] (MHz)
    rx.nf: Noise Figure vs. Receive frequency [M×1] (dB)
    rx.bw: IF Bandwidth (Hz)
    rx.ip3: Input Ip3 information (structure)
    rx.ip3.fch: Channel freqs in data [M×1] (MHz).
    rx.ip3.foff: Frequency offsets in data [1×N] (MHz).
    rx.ip3.typ: Ip3 Method, 1=inband/out-of-band, 2=vs. RX freq and offset
    rx.ip3.idata: Ip3 values (dBm) [M×N]
    rx.ip3.ip3: Input inband and out-of-band Ip3 vs. receive frequency [M×2].
    rx.ip3.iisf: Ip3 selectivity interpolation scale factor (col 1) and method (col 2) [M×2]..
    rx.sel: RF Selectivity Information (structure)
    rx.sel.fch: Channel freqs in data [M×1] (MHz).
    rx.sel.foff: Frequency offsets in data [1×N] (MHz).
    rx.sel.sdata: Selectivity values (dB) [M×N] (dB)
    rx.sel.typ: Selectivity Type
    rx.sel.fc: Fixed tuned selectivity center frequency (Hz)
    rx.sel.bwtyp: Bandwidth type. 1=fixed, 2=percentage
    rx.sel.bw: Bandwidth (Mhz) or (%)
    rx.sel.rip: Chebyshev ripple (dB)
    rx.sel.n: Number of sections
    rx.sel.maxrej: Maximum rejection (dB)
    rx.sel.sisf: Selectivity interpolation scale factor (col 1) and method (col 2) [M×2]
    rx.ifsel: [Offset, IF Selectivity] ([MHz, dB])
    rx.pn: Phase Noise vs receive frequency and offset [M×N] matrix (dBc/Hz)
    rx.xmod: RX Cross-Modulation Term (0=no cross mod, 1=include cross mod)
    rx.degch: [K×2] array of degraded channels (Hz) in column 1 and amount of degradation (dB) column 2.
    rx.agcref: [1×2] AGC Power Reference Location
    rx.nfagc: Noise Figure AGC Characteristic [N×1
    rx.ip3agc: Ip3 AGC Characteristic [N×1] [dB, Delta Ip3]

A receive frequency may also be selected by a user (block 66). The receive frequency is the desired operational frequency of the receiver-under-analysis. In at least one implementation, only a single receive frequency will be tested at a time. If interference susceptibility performance information is desired for other receive frequencies, the analysis procedure may be repeated for the other frequencies.

A transmit frequency offset range may next be selected (block 68). The offset range may include a range of transmit frequencies that will be tested as interference during the analysis. As will be described in greater detail, in order to obtain interference susceptibility information, the interfering transmitter frequency may be swept. The transmitter frequency may be swept linearly, logarithmically, or in some other fashion. The transmitter frequency sweep range may be entirely below the receive frequency, entirely above the receive frequency, or it may start below the receive frequency and end above the receive frequency. In various embodiments, the number of points in the transmit frequency sweep may be defined by the user.

The output of a COMSET interference analysis procedure may include a Carrier-to-Noise Ratio (CNR) or some other metric. In addition, COMSET may provide a number of transfer functions that can be used to convert CNR information into other performance based information. In some implementations, a user may select a transfer function to be used during an analysis (block 70). By choosing any of the COMSET transfer functions, the CNR may be converted to a format of the user's choosing.

An initial condition may next be selected by a user (block 72). As described previously, the initial condition is a performance level of the receiver that is established when no interference is present. It may be used as a baseline during an interference susceptibility analysis to gauge performance degradation. The format of the initial condition may be dictated by the COMSET transfer function selected by the user in some implementations. If no transfer function is selected, the initial condition may, for example, be specified as a CNR in a COMSET-based system. Other formats may be used when transfer functions are specified.

A degraded condition may also be selected by a user (block 74). The degraded condition is the performance level of the receiver that is used as the target value for determining a corresponding transmit power level. In some implementations, when this degraded level of performance is reached, the amplitude of the interfering transmitter may be recorded for the current frequency offset. In another approach, a full range of performance metrics may first be generated for a transmitter offset frequency and then the metrics may be analyzed to determine a transmit power level that results in the degraded level of performance (using, for example, interpolation or a similar technique).

The COMSET interference analysis procedure generally requires that a two-channel platform model be created from the specified transmitter and receiver models (block 76). The platform model may be created by inserting the receiver model parameters into channel 1 and the transmit dataset parameters into channel 2 of the platform model. Since the COMSET receiver models and transmit datasets are standardized, this may be a direct insertion. After the platform model has been created, a COMSET Presim structure may be created by processing the platform model (block 78). The Presim structure includes the data that is sent to the COMSET interference analysis procedure. In a COMSET-based system, the Presim structure may be created by calling a Presim function.

The COMSET interference analysis procedure for a two-channel platform model uses a master simulation array of $[M \times 2 \times 3]$, where M is a number of time units. The number of time units used may vary from implementation to implementation and may be user-selectable (block 80). In one approach, 250 time units are used for each offset frequency in a transmit frequency sweep. The total number of time units in an interference susceptibility analysis, therefore, would be 250× the number of transmit offset frequencies.

As described above, an initial condition may be selected by a user as a performance level of the receiver when no interference is present. A receive signal level may be determined that results in this performance level in the receiver (block 82). To determine the receive signal level, in one possible approach, an arbitrary value may first be assigned as the receive signal level and an iterative loop may be entered. During each iteration of the loop, the COMSET interference analysis procedure may be called with the transmit channel (i.e., the interference channel) set to inactive. This returns a CNR value (or other metric value) with no interference. The CNR value may then be compared to the initial condition CNR. If the CNR value is not sufficiently close to the initial condition (e.g., within 0.01 dB, etc.), then the receive signal level is adjusted up or down as required and the loop is repeated. The loop may terminate when the CNR value (or other metric value) is sufficiently close to the initial condition. The resulting signal level value may then be used as the received signal level. During the interference susceptibility procedure, this signal level may be used for each of the different time units. Therefore, the signal level may be replicated to size $[M \times 1]$ in some implementations.

The master simulation array may next be created (block 84). As described above, the master simulation array may have size $[M \times 2 \times 3]$, where M is the number of time units. The second dimension of the master simulation array is the number of channels, with one channel for receive and one channel for transmit. The third dimension of the master simulation array may have three elements, where element 1 is the channel activity (0=idle, 1=transmit, 2=receive), element 2 is the frequency (MHz), and element 3 is the resulting CNR. Thus:

[M×1×1]=2 sets the activity for all time units for channel 1 to receive;

[M×2×1]=1 sets the activity for all time units for channel 2 to transmit; and

[M×1×2]=RX Frequency sets the frequency for all time units for channel 1 to the receive frequency.

The transmit channel frequencies may be assigned in 250 time unit blocks. For example,

[1:250×1×2]=RX Freq+TX Offset (1) sets the frequency for the first 250 time units in the transmit channel to the absolute frequency that corresponds to the first transmit offset frequency.

[251:500×1×2]=RX Freq+TX Offset (2) sets the frequency for the second 250 time units in the transmit channel to the absolute frequency that corresponds to the second transmit offset frequency.

[501:750×1×2]=RX Freq+TX Offset (3) sets the frequency for the third 250 time units in the transmit channel to the absolute frequency that corresponds to the third transmit offset frequency, and so on.

After the master simulation array has been created, a variable attenuation array may be created (block 86). The variable attenuation array is used to vary the transmit power level applied to the COMSET interference analysis procedure for each transmit offset frequency. In one approach, the variable attenuation array may include a $[250 \times 1]$ array with values from 0 to 249 in steps of 1. This array block may then be replicated until it becomes $[M \times 1]$. Since the blocks in the variable attenuation array are 250 time units long, they correspond to the 250 time units that exist in the master simulation array for each transmit frequency offset.

The COMSET interference analysis procedure may next be called (block 88). During the COMSET interference analysis procedure, the variable attenuation array may be applied to the transmit power level of channel 2 as channel 1 is processed as a receiver. The result is a power level ramp from the transmit power level in the channel to a level 250 dB below that level. Therefore, as each transmit frequency offset is evaluated, the level of the interfering signal may be varied by 249 dB using the variable attenuation array in some implementations.

The CNR outputs of the COMSET interference analysis procedure may next be reshaped to [250×# Offsets] (block 90). The size of the CNR results from the call to the COMSET interference analysis procedure is $[M \times 1]$. As the first 250 time units correspond to the first transmit frequency offset with the interfering signal varied over a 249 dB range, these 250 time units become column 1 of the reshaped array. Similarly, the second 250 time units correspond to the second transmit frequency offset with the interfering signal varied over a 249 dB range and these 250 time units become column 2 of the reshaped array. This process may then be repeated until a column exists in the reshaped CNR array for each transmit frequency offset.

For each column of the reshaped CNR array, a transmit signal level may be determined that results in the degraded condition in the receiver (block 92). For example, in one approach, column 1 of the reshaped CNR array may be analyzed and the two rows that encompass the degraded CNR value may be identified. A linear interpolation may then be used to determine an exact interfering signal level that causes the degraded CNR. This value may then be retained for transmit frequency offset 1. The process may then be repeated for all transmit frequency offsets. The results of this process may then be plotted (block 94). At this point, the method 60 may terminate or be repeated using different input data (e.g., a different receive frequency, etc.).

In some implementations, the above-described methods 30, 60 may be repeated using different initial conditions to obtain better characterizations of a receiver model being evaluated. Likewise, in some implementations, the above-described methods 30, 60 may be repeated using different degraded conditions to obtain better characterizations of the receiver model being evaluated.

Figure 5:
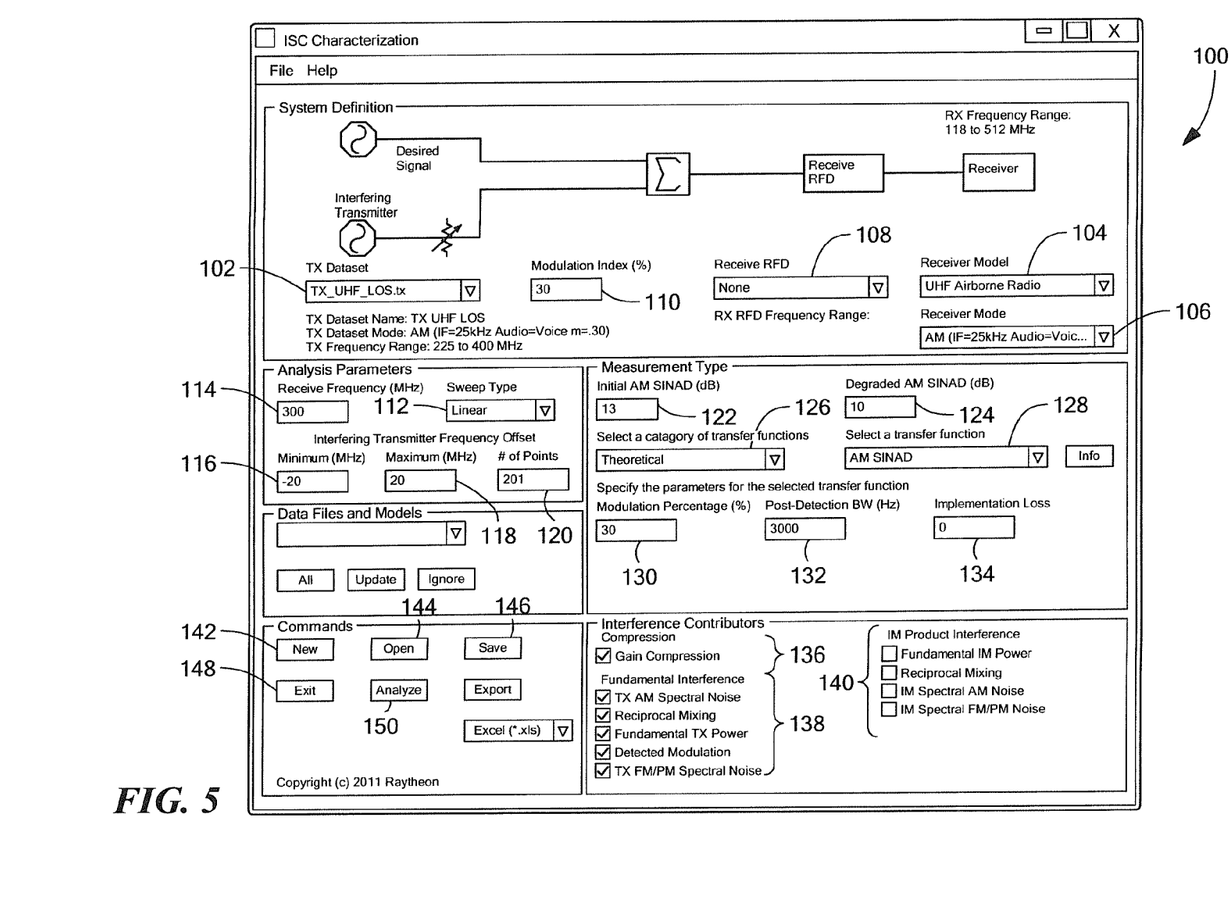
FIG. 5 is a screen shot of an example GUI screen that may be used to allow a user to enter information describing an interference susceptibility analysis procedure to be performed in accordance with an implementation.

As described above, in some implementations, a graphical user interface (GUI) may be used to allow a user to enter information describing an interference susceptibility analysis procedure to be performed. FIG. 5 is a screen shot of an example GUI screen 100 that may be used in accordance with an implementation. As illustrated, GUI screen 100 includes a plurality of drop-down lists and text boxes allowing a user to input analysis parameters. For example, in a "System Definition" section, GUI screen 100 includes a drop-down list 102 for selecting one of a number of transmitter datasets, a drop-down list 104 for selecting one of a number of receiver models, a drop-down list 106 for selecting one of a number of receiver modes, and a drop-down list 108 for selecting one of a number of receive RFD models. The "System Definition" section also includes a text box 110 for specifying a modulation index.

In an "Analysis Parameters" section, GUI screen 100 includes a drop-down list 112 for selecting one of a number of sweep types for sweeping through interfering transmitter frequency offset values. The "Analysis Parameters" section also includes a text box 114 for specifying a receive frequency for a receiver to be analyzed, text boxes 116, 118 for specifying minimum and maximum interfering transmitter frequency offsets to be swept through, and a text box 120 for specifying a number of points to be swept through between the minimum and maximum offsets.

In a "Measurement Type" section, GUI screen 100 includes a text box 122 for entering an initial condition (e.g., an initial AM signal to noise and distortion ratio (SINAD), etc.) and a text box 124 for entering a degraded condition (e.g., a degraded AM SINAD, etc.). The "Measurement Type" section also includes a drop-down list 126 for selecting a category of transfer functions and a drop-down list 128 for selecting a transfer function within the selected category. The "Measurement Type" section also includes a number of text boxes 130, 132, 134 for specifying parameters of a selected transfer function.

In an "Interference Contributors" section, GUI screen 100 includes a number of check boxes 136, 138, 140 for specifying various interference contributors to be taken into account during an interference analysis. A user simply enters a check in each relevant box. The "Interference Contributors" section includes a first subsection 136 associated with gain compression, a second subsection 138 associated with fundamental interference, and a third subsection 140 dealing with intermodulation (IM) product interference.

GUI screen 100 also includes a "Commands" section having a number of command buttons 142, 144, 146, 148, 150 for use in initiating various tasks. For example, a New button 142 may be provided to allow a user to start a new analysis task, an Open button 144 may be provided to allow a user to retrieve a saved analysis file, a Save button 146 may be provided to allow a user to save a current analysis file, an Exit button 148 may be provided to allow a user to terminate the current analysis, and an Analyze button 150 may be provided to allow a user to execute a currently defined analysis.

It should be appreciated that GUI screen 100 of FIG. 5 represents one technique that may be used for inputting information from a user to define an interference susceptibility analysis to be performed. Other GUI-based and non-GUI-based techniques may alternatively be used.

Figure 6:
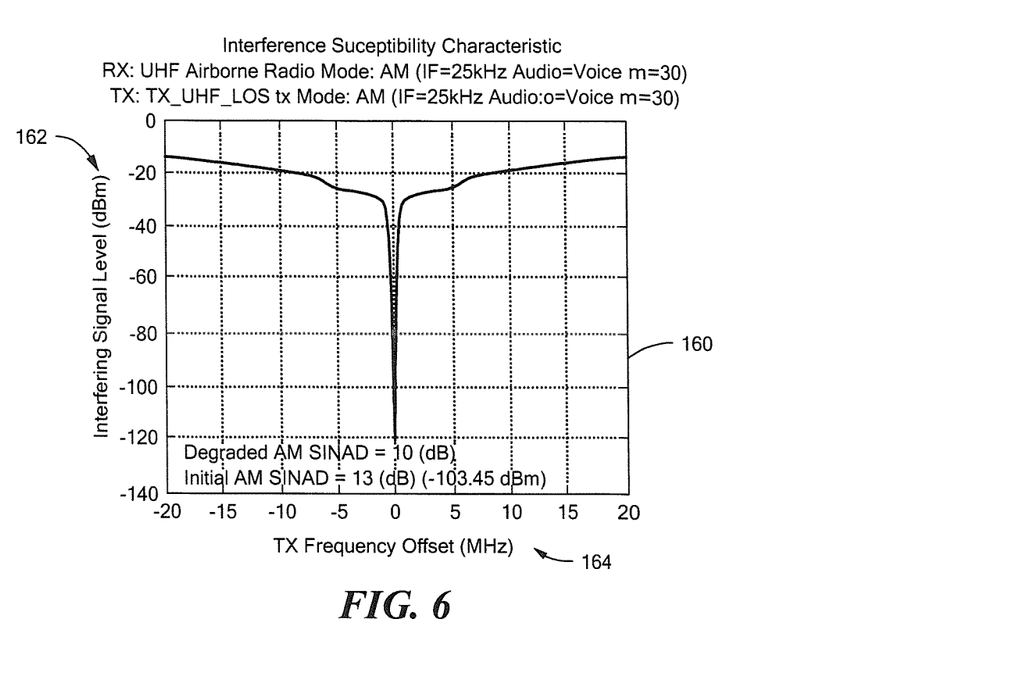
FIG. 6 is a graph illustrating an example interference susceptibility characteristic that may be generated in accordance with an implementation.

FIG. 6 is a graph illustrating an example interference susceptibility characteristic 160 that may be generated in accordance with an implementation. As shown, the interference susceptibility characteristic 160 plots an interfering signal level 162 that results in a degraded level of performance as a function of transmit frequency offset 164. As should be expected, at a transmit frequency offset value of zero, very little interference power is required to degrade the receiver performance by the specified amount. As the transmit frequency offset value gets larger in each direction, however, an increased amount of interfering signal level is needed to degrade the receiver performance by the specified amount.

Figure 7:
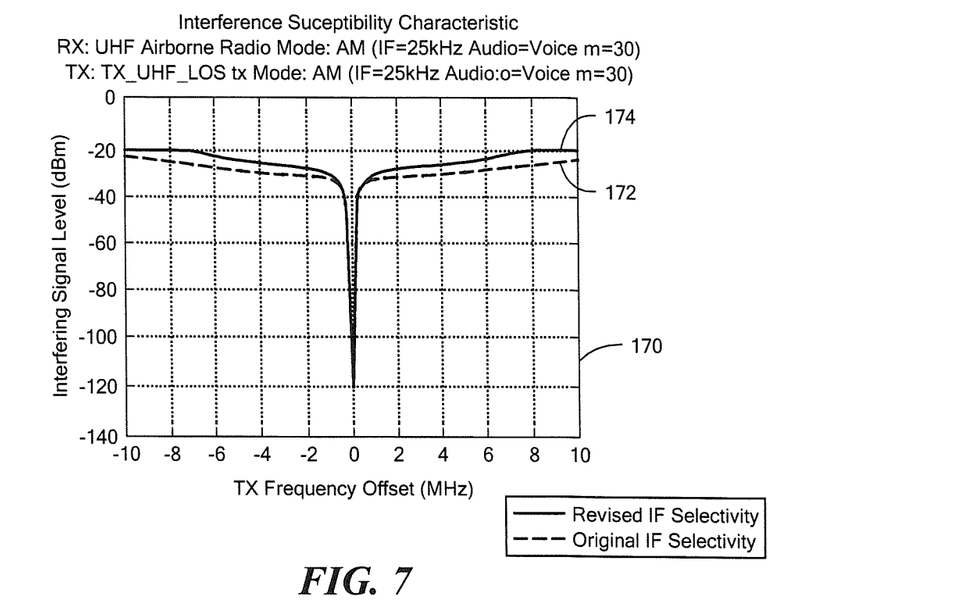
FIG. 7 is a graph illustrating how an interference susceptibility characteristic may be used to modify a receiver design in accordance with an implementation.

FIG. 7 is a graph illustrating how an interference susceptibility characteristic generated in accordance with concepts described herein may be used to modify a receiver design before any receiver hardware is constructed in accordance with an implementation. An interference susceptibility analysis may first be performed for an initial receiver design, during which a first interference susceptibility characteristic 172 is generated. Review of the first interference susceptibility characteristic 172 may indicate to a designer that the receiver design is too sensitive to interference at one or more offset frequencies (e.g., at +/−10 MHz, etc.). The designer may determine, for example, that an increase in an IF selectivity of the receiver design may improve receiver performance in the presence of interference. After design changes have been made, a second interference susceptibility characteristic 174 may be generated. As illustrated, the second interference susceptibility characteristic 174 may show that the improved IF selectivity of the receiver design provides a marked enhancement in the receiver performance in the presence of interference. For example, at a transmit frequency offset of −10 MHz, first interference susceptibility characteristic 172 shows that a interfering signal level of −27 dBm results in the specified level of performance degradation. At the same offset, second interference susceptibility characteristic 174 shows that an interfering signal level of −20 dBm is required to generate the same level of performance degradation, an improvement of 7 dB. Because this design change was made before any circuitry was constructed, significant re-design costs may have been avoided.

In the discussion above, techniques and systems have been described in the context of analyzing receiver system designs before hardware has been constructed. It should be appreciated that the techniques and systems described herein also have applications after receiver hardware has been built. For example, in one application, the techniques may be used to validate receiver model data if receiver measurement data is available.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine implemented method to simulate interference susceptibility performance of a radio receiver design, comprising:
defining a plurality of receiver parameters;
retrieving data from a receiver model database to specify one of a plurality of possible values for each of the plurality of receiver parameters;
generating a receiver model based upon the receiver parameters and the specified receiver parameter values, the receiver model describing a receiver design for which interference susceptibility is to be simulated prior to building the receiver design in hardware;

receiving input identifying a receive frequency to be used for the simulation;
defining a plurality of transmitter parameters; receiving data from a transmitter model database to specify one of a plurality of possible values for each of the plurality of transmitter parameters;
generating, in a processor, a transmitter model based upon the transmitter parameters and the specified transmitter parameter values, the transmitter model describing a transmitter to be used as a source of interference for the simulation;
receiving input identifying a number of offset transmit frequencies to be used as interference for the simulation;
determining, in the processor, a receive signal power level to generate a predetermined performance level in the receiver design in the absence of interference;
for each of the number of offset transmit frequencies, performing, in the processor, an interference analysis using the receiver model, the receive frequency, the transmitter model, and the receive signal power level for a plurality of different transmit power levels to generate a plurality of performance metrics corresponding to the plurality of different transmit power levels;
for each of the number of offset transmit frequencies, determining, in the processor, a transmit power level that results in a predetermined level of performance degradation for the offset transmit frequency using the corresponding plurality of performance metrics; and
generating, in the processor, a plot using the determined transmit power levels.

2. The method of claim 1, further comprising:
receiving input identifying the predetermined performance level before determining the receive signal power level.

3. The method of claim 1, further comprising:
receiving input identifying the predetermined level of performance degradation before determining a transmit power level.

4. The method of claim 1, wherein:
receiving input identifying a transmitter model includes receiving input identifying a COMSET transmitter dataset.

5. The method of claim 1, wherein:
receiving input identifying a receiver model includes receiving input identifying a COMSET receiver model.

6. The method of claim 1, wherein:
determining a receive signal power level to generate a predetermined performance level in the receiver design in the absence of interference includes performing an interference analysis using the receiver model and the receive frequency with no interference for a number of different receive signal power levels and identifying a receive signal power level that results in a performance value that is within a specific range of the predetermined performance level.

7. The method of claim 1, wherein:
receiving input identifying a number of offset transmit frequencies to be used as interference includes receiving a start frequency, a stop frequency, and a number of test points between the start frequency and the stop frequency.

8. The method of claim 1, wherein:
performing an interference analysis using the receiver model, the receive frequency, the transmitter model, and the receive signal power level for a plurality of different transmit power levels includes generating a two-channel platform model having the receiver model as a first channel and the transmitter model as a second channel.

9. The method of claim 8, wherein:
performing an interference analysis includes generating a variable attenuation array that includes a plurality of different signal attenuation values to be used during the interference analysis to vary transmit power level.

10. A system to simulate interference susceptibility performance of a radio receiver design, comprising:
a database of receiver models, each of the receiver models describing a receiver design using a plurality of receiver parameters and a corresponding plurality of receiver parameters values;
a database of transmitter models, each of the transmitter models describing a transmitter design using a plurality of transmitter parameters and a corresponding plurality of transmitter parameters values;
a user interface to receive input information from a user regarding an interference susceptibility simulation to be performed;
an interference analysis processor to perform interference analyses for the radio receiver design; and
an interference susceptibility controller to use the interference analysis processor to generate interference susceptibility information for an identified receiver design, the interference susceptibility information being descriptive of a susceptibility of the identified receiver design to certain types of interference, wherein the interference susceptibility controller is configured to receive input information identifying: a receiver model describing a receiver design for which interference susceptibility is to be simulated prior to building the receiver model in hardware, a receive frequency to be analyzed, a transmitter model describing a transmitter to be analyzed as a source of interference, and a number of offset transmit frequencies to be analyzed as interference;
wherein the interference susceptibility controller is configured to, for each of the number of offset transmit frequencies, call the interference analysis processor to perform an interference analysis using the receiver model, the receive frequency, the transmitter model, and a predetermined receive signal power level for each of a plurality of transmit power levels, wherein the interference analysis processor is configured to return a performance metric to the interference susceptibility controller for each transmit power level associated with each offset transmit frequency; and
wherein the interference susceptibility controller is configured to, for each of the number of offset transmit frequencies, analyze performance metrics received from the interference analysis processor to identify a transmit power level that results in a predetermined level of receiver performance degradation.

11. The system of claim 10, wherein:
the interference susceptibility controller is configured to receive input from a user identifying a predetermined receiver performance level in the absence of interference to be used as a baseline in an interference susceptibility analysis.

12. The system of claim 11, wherein:
the interference susceptibility controller is configured to use the interference analysis processor to determine a receive signal power level that results in the predetermined receiver performance level in the receiver when no interference is present.

13. The system of claim 10, wherein:
the interference susceptibility controller is configured to cause a plot to be generated of transmit power levels that resulted in the predetermined level of receiver performance degradation.

14. The system of claim 10, wherein:
the predetermined level of receiver performance degradation is user-specified.

15. A system to simulate interference susceptibility performance of a radio receiver design, comprising:
   a means for generating a receiver model using a defined plurality of receiver parameters and data from a receiver model database to specify one of a plurality of possible values for each of the plurality of receiver parameters;
   a means for generating a transmitter model using a defined plurality of transmitter parameters and data from a transmitter model database to specify one of a plurality of possible values for each of the plurality of transmitter parameters
   means for receiving input identifying user selected parameters for use in performing an interference susceptibility simulation, the user selected parameters including a receiver model describing a receiver design for which interference susceptibility is to be simulated prior to building the receiver design in hardware, a receive frequency to be analyzed, a transmitter model describing a transmitter to be analyzed as a source of interference, and a number of offset transmit frequencies to be analyzed as interference;
   means for determining a receive signal power level to generate a predetermined receiver performance level in the absence of interference;
   means for performing an interference analysis using the receiver model, the receive frequency, the transmitter model, and the receive signal power level for each of the number of offset transmit frequencies at a plurality of different transmit power levels to generate a plurality of performance metrics for each offset transmit frequency corresponding to the plurality of different transmit power levels;
   means for determining a transmit power level that results in a predetermined level of performance degradation in the receiver design for each offset transmit frequency by analyzing a corresponding plurality of performance metrics; and
   means for generating a plot using the determined transmit power levels.

16. The system of claim 15, wherein:
the means for determining a receive signal power level includes means for performing an interference analysis using the receiver model and the receive frequency, with no interference, for a number of different receive signal power levels and means for identifying a receive signal power level that results in a performance level that is within a specific range of the predetermined performance level.

17. The system of claim 16, wherein:
the predetermined receiver performance level is user specified.

* * * * *